4 Sheets--Sheet 1.

J. H. KINSMAN.

Door-Locks.

No. 6,196. Reissued Dec. 29, 1874.

WITNESSES

Harry King

H. H. Young

INVENTOR

John H. Kinsman

By his Attorney

Wm D. Baldwin

THE GRAPHIC CO. PHOTO-LITH. 39 & 41 PARK PLACE, N.Y.

J. H. KINSMAN.

Door-Locks.

No. 6,196. Reissued Dec. 29, 1874.

WITNESSES

Harry King

H. H. Young

INVENTOR

John H. Kinsman

By his Attorney

Wm D. Baldwin

THE GRAPHIC CO. PHOTO-LITH. 39 & 41 PARK PLACE, N.Y.

J. H. KINSMAN.

Door-Locks.

No. 6,196. Reissued Dec. 29, 1874.

WITNESSES

Harry King

H. H. Young

INVENTOR

John H. Kinsman

By his Attorney

Wm D Baldwin

THE GRAPHIC CO. PHOTO-LITH. 39 & 41 PARK PLACE, N.Y.

J. H. KINSMAN.
Door-Locks.
No. 6,196. Reissued Dec. 29, 1874.
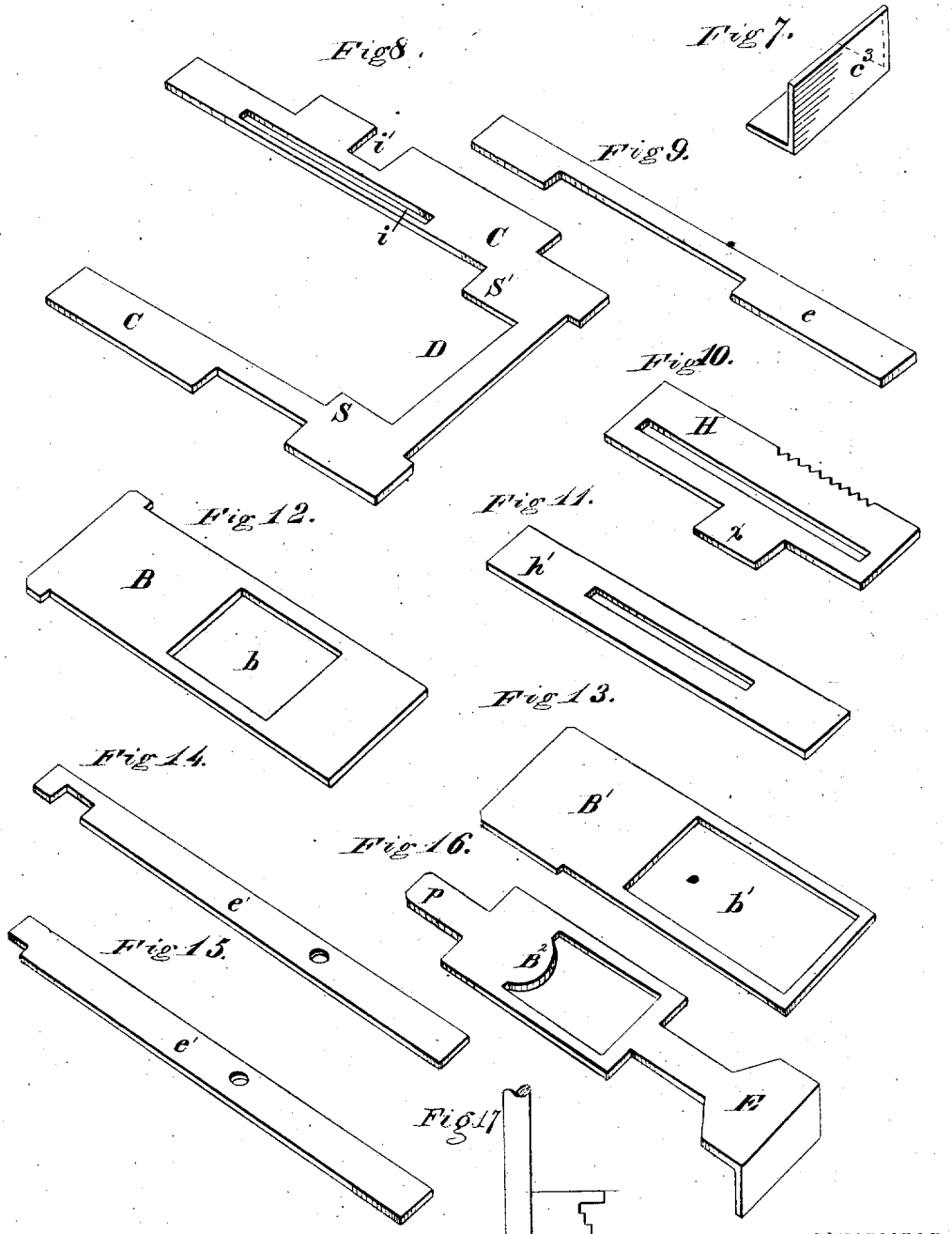
WITNESSES
H. H. Young
Harry Fenn
INVENTOR
John H. Kinsman
By his Attorney
Wm. D. Baldwin
THE GRAPHIC CO. PHOTO-LITH. 39 & 41 PARK PLACE, N.Y.

UNITED STATES PATENT OFFICE.

JOHN H. KINSMAN, OF SALEM, MASSACHUSETTS.

IMPROVEMENT IN DOOR-LOCKS.

Specification forming part of Letters Patent No. 116,452, dated June 27, 1871; reissue No. 6,196, dated December 29, 1874; application filed December 1, 1874.

*To all whom it may concern:*

Be it known that I, JOHN H. KINSMAN, of Salem, in the county of Essex and State of Massachusetts, have invented certain new and useful Improvements in Door-Locks, of which the following is a specification:

My invention relates to that class of permutation-tumbler locks in which the tumblers are moved in both directions by the key. The main object of my invention is to prevent tampering with the lock while the primary and secondary tumblers are in contact by so proportioning the relation of the parts that under the condition above mentioned a space is provided between the actuating slide and the primary tumblers so great that it is impossible to reach the tumblers by actuating the slides with the key. The subject-matter claimed is hereinafter clearly indicated.

Figure 1:
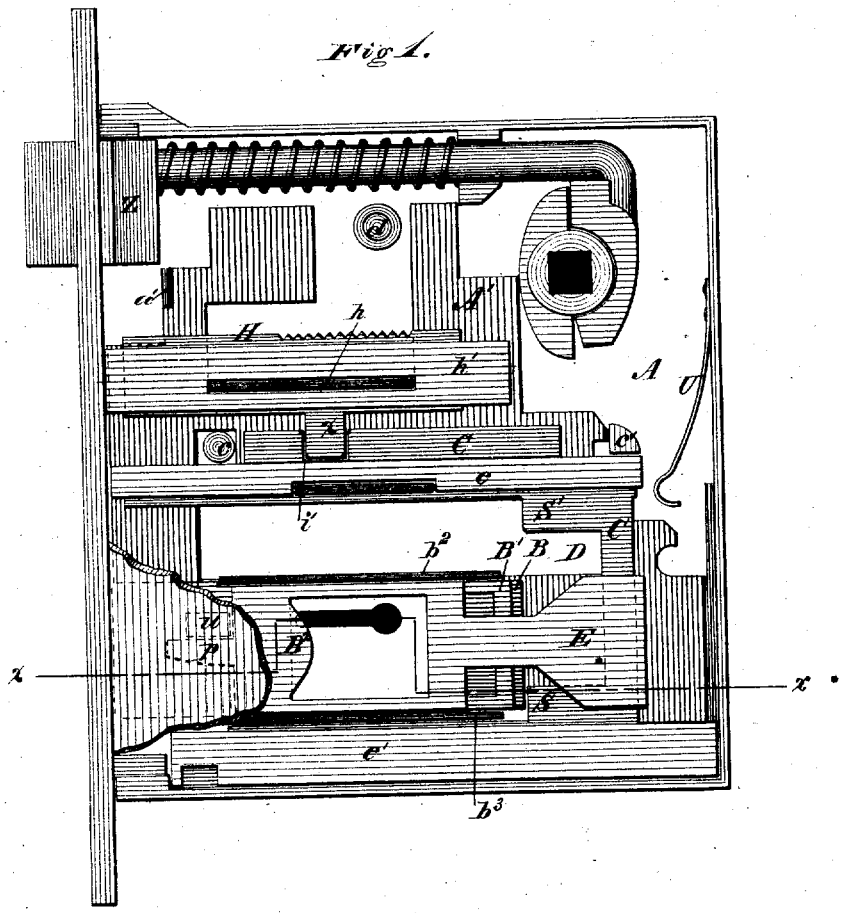
Figure 2:
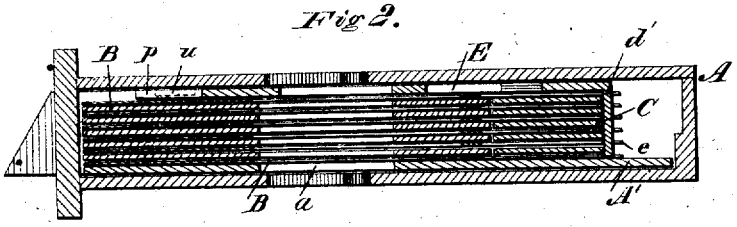
Figure 3:
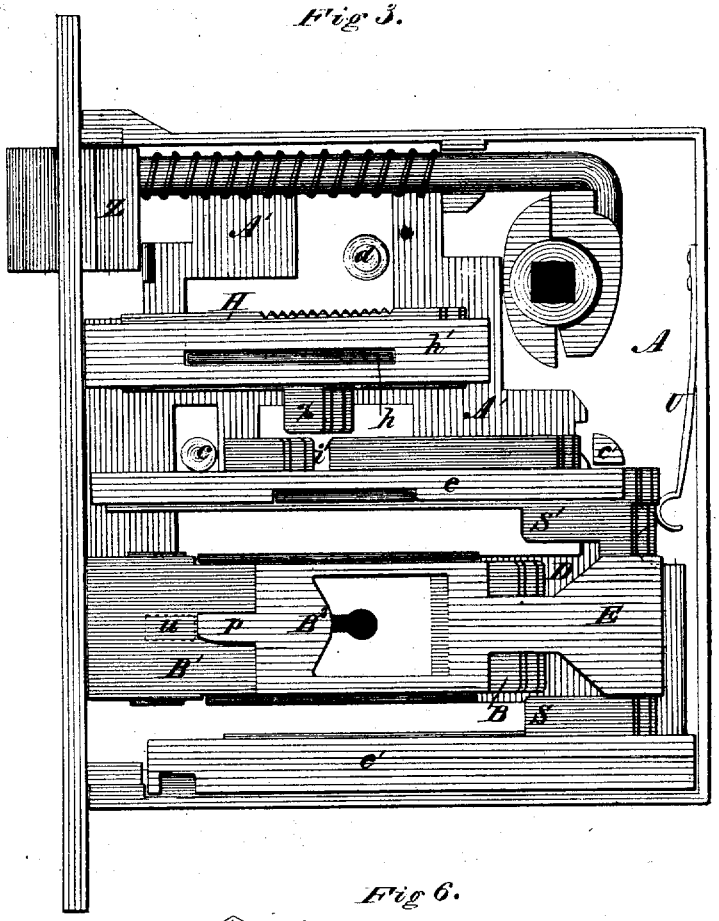
Figure 6:
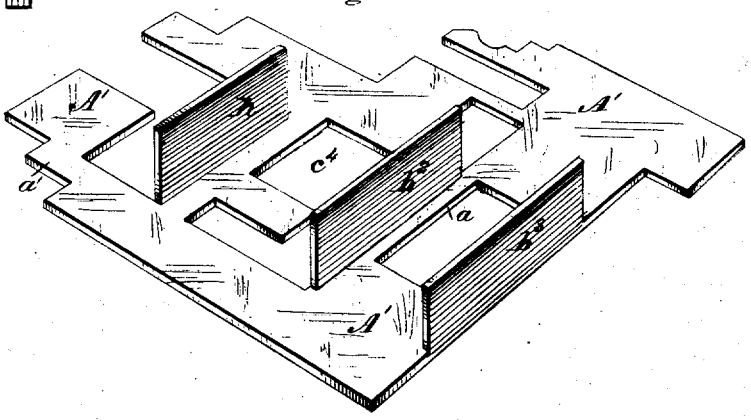
Figure 4:
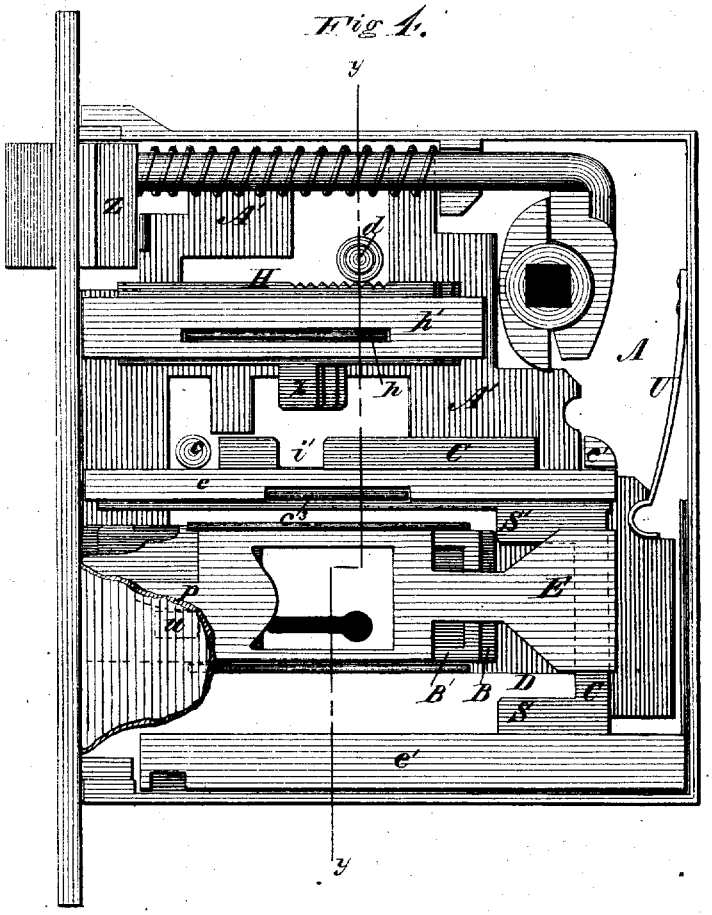
Figure 5:
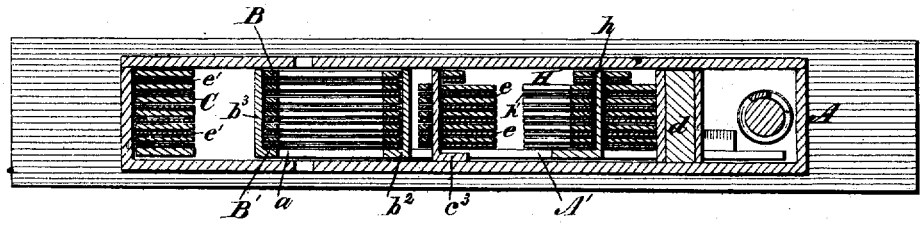

In the accompanying drawings, Figure 1 represents a view in elevation of my improved lock with a portion of one side of the casing broken away to show the interior in an unlocked state. Fig. 2 is a transverse longitudinal section through line *x x* of Fig. 1. Fig. 3 is a similar elevation to Fig. 1, with one side of the casing removed, showing the lock partially unlocked. Fig. 4 is another similar elevation to Fig. 1, with a portion of one of the side-plates broken away, showing the lock in a locked state. Fig. 5 is a vertical transverse section through line *y y* of Fig. 4. Fig. 6 is a view in perspective of the locking-plate detached. Fig. 7 is a view in perspective of the guide for the primary tumblers detached. Fig. 8 is a similar view of one of the primary tumblers; Fig. 9, a similar view of one of the washers which lies between the tumblers. Fig. 10 is a similar view of one of the secondary tumblers. Fig. 11 is a similar view of one of the stationary plates by which the secondary tumblers are separated. Fig. 12 is a similar view of one of the slides which actuate the primary tumblers; Fig. 13, a similar view of one of the stationary slide separating plates. Figs. 14 and 15 are similar views of the bottom washers of the primary tumblers. Fig. 16 is a similar view of the slide by which the primary tumblers and slide plate are retracted to their unlocked position; and Fig. 17 is a side elevation of a portion of one form of key used in connection with my improved lock.

The lock-case A may be made in any of the usual well-known forms. A locking-plate, A′, rests against the back casing of the lock, and may be moved up and down freely by means of the key, one of the outside wards of which abuts against the locking-plate at *a*, Figs. 2 and 5. The edges of the plate abut against the side walls of the casing and prevent horizontal movement of the locking-plate. A shoulder, *a′*, on the locking-plate abuts against the back of the latch, catch, or bolt Z, when the locking-plate is thrown up by the key, and thus locks the bolt securely and prevents its retraction, as in Fig. 4. A series of actuating slides, B, Fig. 12, provided with rectangular slots or openings *b*, for the insertion of the key, are placed upon the locking-plate A′ between guides $b^2$ $b^3$ on the locking-plate and on opposite sides of the key-hole. These slides can be reciprocated freely in their guide, by means of the key. Stationary gage-plates or washers B′, Fig. 13, provided with perforations $b^1$, through which the key passes, are interposed between the actuating slides B, thereby gaging the distance between the slides, so that each ward of the key may independently actuate its respective slide. The actuating slides B, it will be noticed, beside their own horizontal movement in their guides, move vertically with the locking-plate at certain periods, as hereinafter more fully explained.

In their forward movement—that is, when locking the lock—the actuating slides abut against the lower shoulders *s* of a series of skeleton primary tumblers C, (see Fig. 1,) arranged within the casing in such manner as to reciprocate freely horizontally when actuated by the key, but are prevented from moving vertically by suitable stops *c* $c^1$ on the casing.

The tumblers are also provided with guide slots *i*, Fig. 8, in which a stationary guide-plate, $c^3$, Figs. 5 and 7, on the casing fits, an opening, $c^4$, Fig. 6, being provided in the locking-plate to enable it to move past this fixed guide-plate.

The primary tumblers, like the actuating slides, are kept at suitable distances apart by interposed washers *e*, Fig. 9, notched so as to fit around the guide-plate $c^3$, and by washers *e'*, Figs. 14 and 15, near the lower edge of the casing. The primary tumblers are moved in one direction by the key, through the medium of the actuating slides, but are moved in the other direction by the direct action of the key upon a retracting slide or hook, E, Fig. 16, bent so as to overlap the primary tumblers, and moving between the guide $b^2$ $b^3$.

A series of secondary or locking tumblers, H, Fig. 10, are arranged above the primary tumblers. The secondary tumblers are slotted longitudinally, so as to admit of their free reciprocation on a guide-plate, *h*, mounted upon the locking-plate A', Fig. 6. Slotted stationary plates or washers *h'*, Fig. 11, fitting on this guide-plate, and interposed between the locking-tumblers, serve to regulate their distance apart. The secondary tumblers, it will be seen, like the actuating slide, move horizontally on the locking-plate, as well as vertically with it.

The horizontal movement of the locking-tumblers is caused by lugs or studs *x* thereon, at proper intervals, entering notches or recesses *i'* in the primary tumblers C. The upper edges of the secondary tumblers are serrated, as shown in Fig. 10, so that when they are elevated, as in locking the bolt, their serrated edges will abut against an elastic stop, consisting of a pin, *d*, fixed on the casing, and covered with gutta-percha, by which means the locking-tumblers are held securely in place when locked. The locking is done upon the ordinary spring-latch or bolt Z, controlled by the handle of the lock, thus dispensing with a separate bolt.

The operation of the lock is as follows: In Fig. 1 the parts are shown in the position they occupy when the door is unlocked, at which time the series of actuating slides and their interposed washers or gage-plates present a simple rectangular opening, which gives no indication of the relation of the tumblers. The key is now inserted and turned downward, its wards moving the actuating slides into relations determined by the configuration of the key, and at the same time causing these slides to abut against the shoulders *s* of the primary tumblers, which tumblers are, in turn, caused to assume the relation corresponding to those imposed upon the actuating slides by the key, and moved laterally. The effect of this lateral movement is to move the secondary tumblers laterally, and to adjust them into position corresponding with those of the primary tumblers, or, in other words, to set the secondary or locking tumblers into relations corresponding with those of the wards of the key. The further turning of the key now causes the locking-plate to rise, carrying with it the actuating slides and secondary or locking tumblers. The latter are locked in position by abutting against the elastic stop *d*, hereinbefore mentioned, while the stud *a'* moves behind the bolt Z, and prevents its retraction. A friction-spring, U, bears upon the locking-plate, so as to prevent it and the secondary tumblers from dropping by their own weight as soon as the key is turned down past the perpendicular position, so as to give time for the notches *i'* of the primary tumblers to be moved out of line with the studs *x* on the secondary tumblers.

The further turning of the key moves the primary tumblers backward laterally out of line with the displaced stud *x* on the secondary tumblers, and at the same time brings their ends squarely into line by bearing on the part *d'* of the retracting-slide E, Fig. 2, when the key may be withdrawn.

The locking-plate, actuating-slides, and secondary or locking tumblers are now held up in the position shown in Fig. 4, by means of a projection, *p*, on the retracting slide E, which has been moved by the key over a stop, *u*, on the casing. Should an attempt now be made to move the actuating slide by any but the proper key, the first effect would be to disorganize the relation established by the proper key between the two series of tumblers, and as the secondary series are entirely out of relation with the primary ones no amount of tampering with them would indicate the position of the locking-tumblers. Should an attempt be made to tamper with the lock by shoving the projection *p* of the retracting-slide past the stop *u*, and drawing down the locking-plate, the relation of the parts is such that the studs *x* on the locking-tumblers would abut against the tops of the primary tumblers and hold the actuating-slide in such relation to the primary tumblers that they would work in the recess D of the latter between the shoulders S S', the depth of which recess is so great that the actuating-slide cannot reach the primary tumblers, and consequently they could not be tampered with. At the same time the end of the projection *p* of the retracting-slide abuts against the stop, and prevents a backward movement of the slide or primary tumblers while in this position; and at the same time the part $B^2$, Fig. 3, of the retracting-slide partially covers the key-hole, and would prevent the insertion of a key if not previously done.

It will thus be seen that access to the secondary tumblers is impracticable, and the lock is thus practically unpickable.

What I claim as my invention is—

1. The combination, substantially as hereinbefore set forth, of a lock-casing, a locking-plate movable vertically therein, reciprocating actuating slide-plates carried by the locking-plate, and a key, whereby the key determines the relation of the actuating slide-plates, moves them laterally to act upon the series of tumblers, and then lifts them vertically with the locking-plate.

2. The combination, substantially as hereinbefore set forth, of a lock-casing, a locking-plate movable therein, slotted actuating slide-plates, and a retracting-slide carried thereby, the key acting upon the slides, and independent skeleton primary tumblers, movable in guides in the casing, whereby the key determines the relation of the slides, moves the primary tumblers laterally into a corresponding relation, and then moves the actuating and retracting slide-plates transversely to the tumblers, and also in an opposite direction thereto, to destroy the set or relation of the tumblers previously established.

3. The combination, substantially as hereinbefore set forth, of a lock-casing, a locking-plate movable therein, actuating-slides carried by the locking-plate, and movable transversely to the line of movement of the locking-plate, a key which determines the set of the tumblers, primary tumblers actuated by the slides, and movable upon the casing, and the secondary tumblers mounted upon the locking-plate, and movable transversely thereto, whereby the secondary tumblers are moved in a position determined by the key, detached from the primary tumblers, and left in such detached position as long as the door is locked.

4. The combination, substantially as hereinbefore set forth, of the locking-plate, the secondary tumblers, and actuating-slides carried thereby, with the skeleton primary tumblers, whereby, when the studs on the locking-tumblers rest upon the top of the primary tumblers, the actuating-slides are brought opposite a recess in said primary tumblers, and render said tumblers inoperative.

J. H. KINSMAN.

Witnesses:
WM. J. PEYTON,
E. C. DAVIDSON.